United States Patent [19]

Yamashita

[11] 4,279,586

[45] Jul. 21, 1981

[54] AUTOMATIC MOLD GOODS DROPPING DEVICE IN AN INJECTION MOLDING MACHINE

[76] Inventor: Yukio Yamashita, No. 3276-2, Hirooka, Fukuroi-shi, Shizuoka-ken, Japan

[21] Appl. No.: 174,111

[22] Filed: Jul. 31, 1980

[30] Foreign Application Priority Data

Aug. 9, 1979 [JP] Japan ................................ 54/101426

[51] Int. Cl.³ ............................................. B29F 1/14
[52] U.S. Cl. .................................. 425/438; 425/577; 425/444

[58] Field of Search ............... 425/436, 438, 577, 556, 425/546, 444

[56] References Cited

U.S. PATENT DOCUMENTS

| 3,837,772 | 9/1974 | Van de Walker et al. ....... 425/577 X |
| 3,904,165 | 9/1975 | Den Boer ......................... 425/438 X |

Primary Examiner—J. Howard Flint, Jr.
Attorney, Agent, or Firm—Holman & Stern

[57] ABSTRACT

This invention comprises a device for automatically dropping mold goods in an injection molding machine instantaneously when the mold is opened.

2 Claims, 9 Drawing Figures

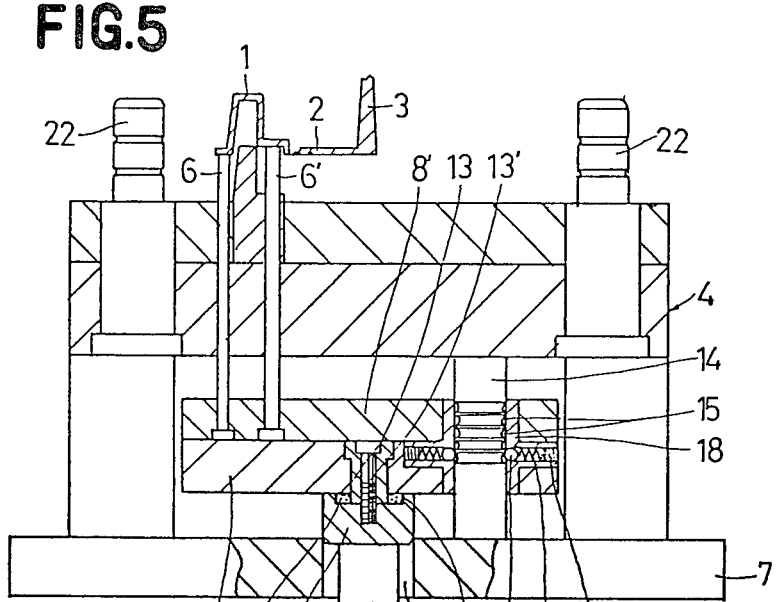
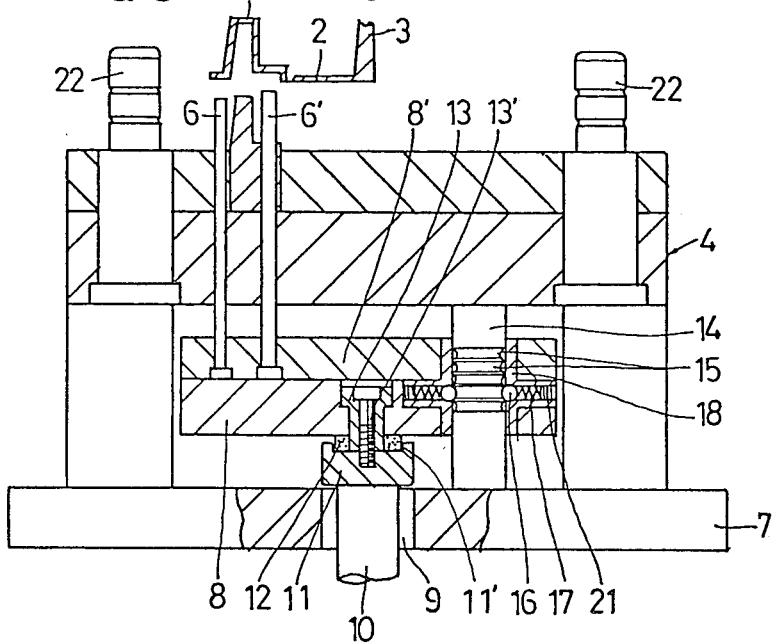

AUTOMATIC MOLD GOODS DROPPING DEVICE IN AN INJECTION MOLDING MACHINE

SUMMARY OF THE INVENTION

This invention relates to a device for automatically dropping mold goods in an injection molding machine by imparting vibrations to the mold goods through a vibration-generating pin.

DETAILED DESCRIPTION OF THE INVENTION

This invention relates to a device for automatically dropping mold goods in an injection molding machine.

Conventionally, for taking out mold goods from an injection molding machine there has been employed a construction wherein are arranged push-out pins to be dropped suddenly by means of a hydraulic cylinder, but in the case of such a manner it sometimes occurs that the goods may be reverted to the movable metal mold, presenting the drawbacks of impossibility of taking out the goods always for certain and thus requiring especially the necessity of employing any robot fingers.

An object of the present invention is to provide an automatic dropping device capable of performing goods removing operations smoothly and with much reliability.

It is an object of the present invention to provide a device which is highly safe and able to rapidly taking out the goods from the mold of an injection molding machine.

It is another object of the present invention to provide a device wherein the molding time can remarkably be reduced, requiring no robot fingers such as conventionally used.

The accompanying drawings show one preferred embodiment of an automatic mold goods dropping device in an injection molding machine according to the present invention, wherein:

FIGS. 4 to 6 are longitudinal sectional front views of the device showing a state of giving vibrations to the goods.

Figure 1:
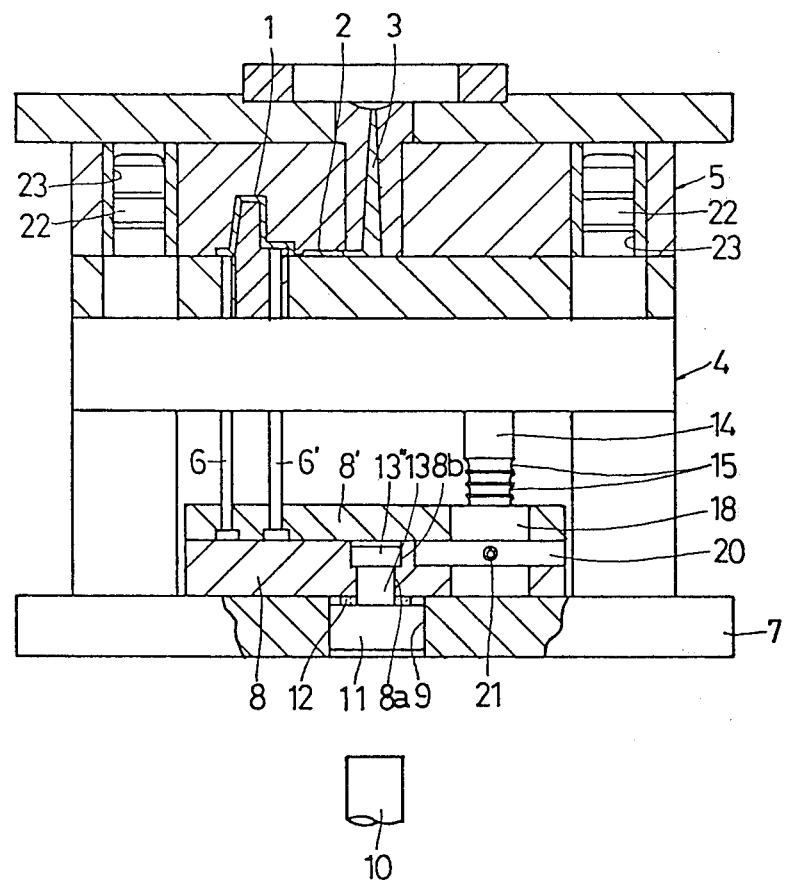
FIG. 1 is an elevational view in longitudinal section when in molding operation.
Figure 2:
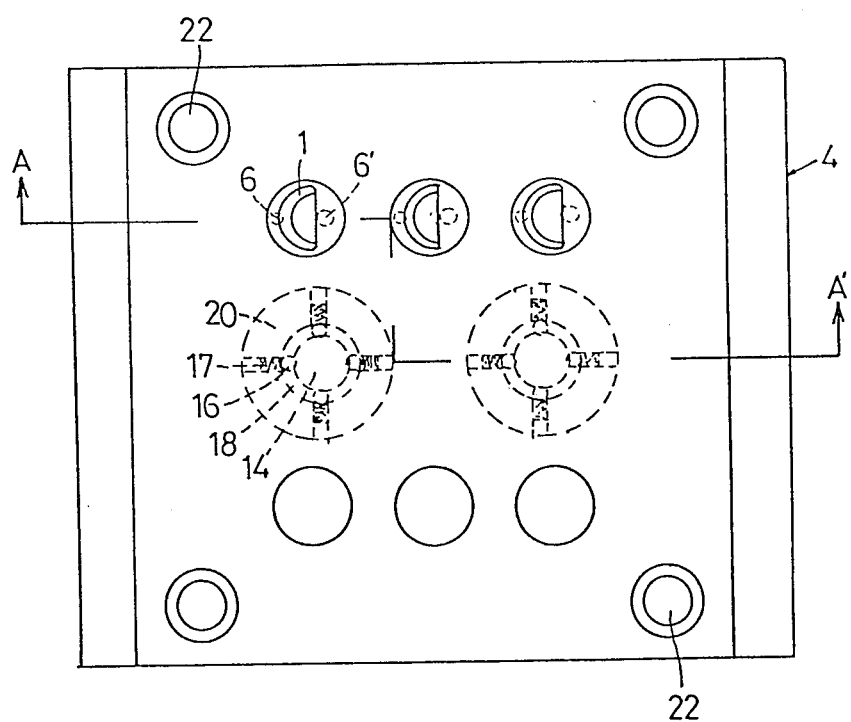
FIG. 2 is a top plan view of the movable metal mold.

The invention will now be explained hereinafter with reference to the accompanying drawings showing one preferred embodiment of the automatic mold goods dropping device of an injection molding machine according to the present invention.

In the drawings, 1 indicates a mold goods, 2 is a runner, 3 shows a spool, 4 denotes a movable metal mold, and 5 is a stationary metal mold. 6 and 6' are push-out pins inserted in a push-out plate 8' on a push-out plate 8 so as to projecting from the double push-out plates 8, 8' disposed on a base plate 7. In the central aperture 9 of the base plate 7, there is inserted a plate member 11 which is to be abutted by a knock-out pin 10 from the side of the machine. Support tube 13 vertically secured by a screw 13' in the center of the plate 11 is inserted in a hole 8a provided in the push-out plate 8 with the extended head 13" of the support tube 13 being hung on the shoulder portion 8b of the hole 8a. An annular elastic member 12 inserted in the recess 11' in the upper surface of the plate member 11 is made to contact the bottom surface of the push-out plate 8 so that the elastic member 12 may be compressed when the plate member 11 is pushed by the knock-out pin 10.

Figure 7:
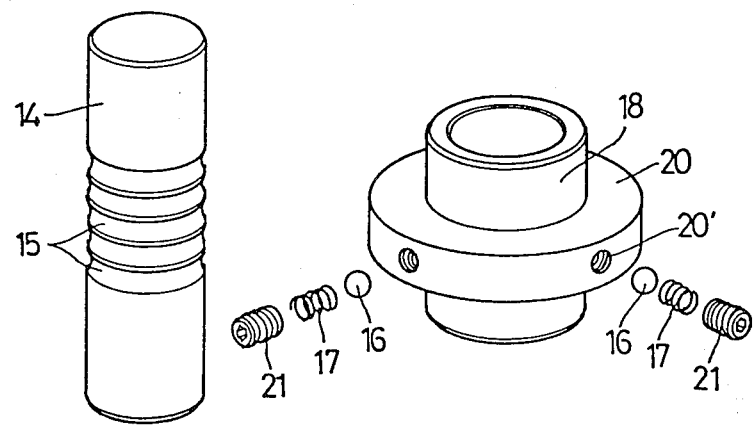
FIGS. 7 to 9 are perspective views of the vibration-generating and guide pins in which FIG. 7 only shows an exploded view.
Figure 8:
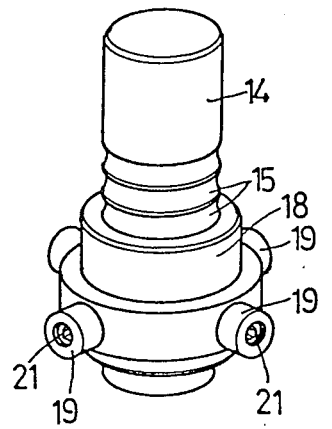
Figure 9:
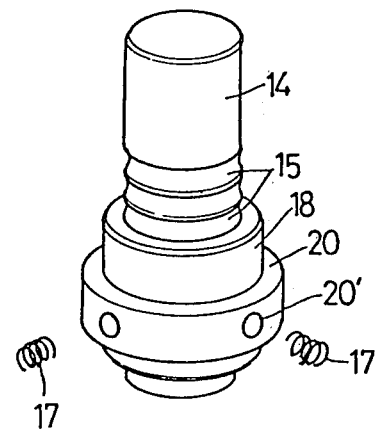

In a preferred embodiment of the present invention, it is designed that the pin 14 serving as a guide for the push-out plates 8, 8' is to be given vibrations. That is, the pin 14 is a guide and vibration-generating pin that serves to transfer vibrations to the push-out pins 6, 6' when pushing out the goods 1 when the mold is opened, said pins serving to remove the goods by the vibrations together with the runner and spool. As shown in FIGS. 7 to 9, the guide and vibration-generating pin 14 is formed along the peripheral surface thereof with grooves in steps, said grooves being an arch form in vertical section. Around the pin 14 there is provided a guide tube 18 that is to press balls 16 with coil springs 17 against the groove surface of the pin 14.

Figure 3:
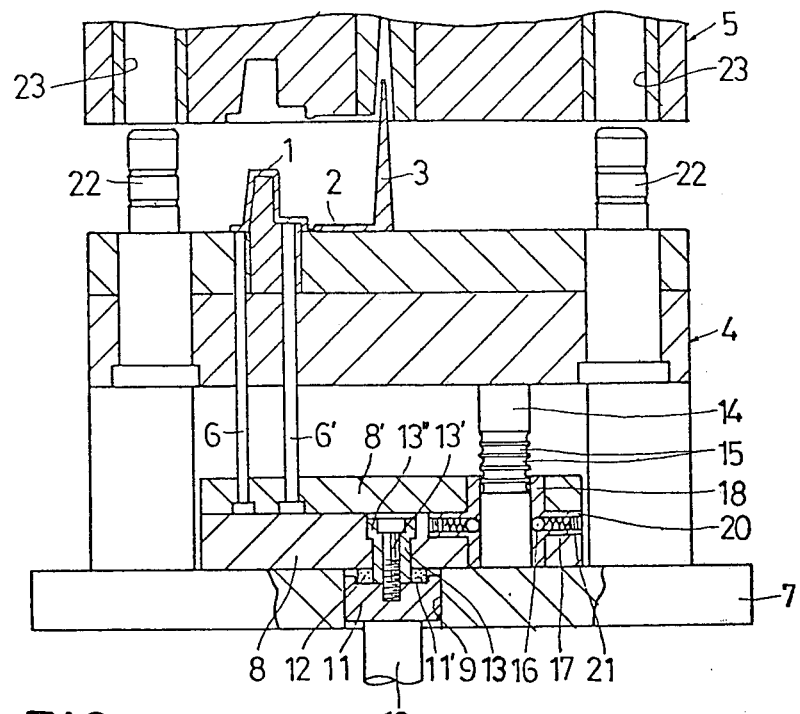
FIG. 3 is a longitudinal sectional front elevation of the device at the time when the mold is opened when the movable metal mold has been separated from the stationary metal mold.
Figure 4:
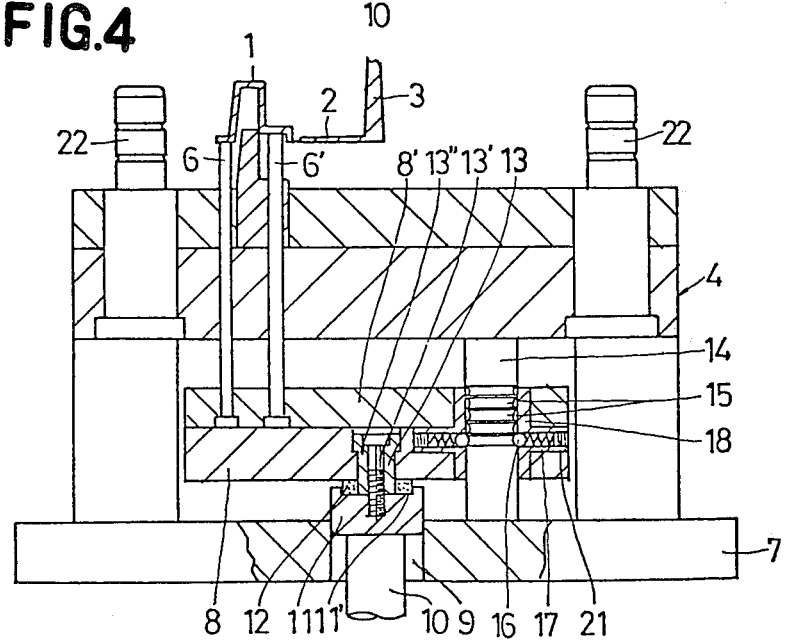

Balls 16 and springs 17 are disposed within the holes 20' of the tubes 19 or flanges 20 projecting radially from the guide tube 18 and the knock-out pin 10 is arranged to abut the plate 11 while the mold is opened (that is, during the movement of the movable metal mold 4) (See FIG. 3). At this moment, since the knock-out pin 10 is fixed on the side of the machine (adversely expressed, the movable metal mold 4 is in movement) the power thereof is transmitted to the push-out plates 8, 8', thereby the ball 16 enters the first groove 15 along the peripheral surface of the pin 14 (the ball 16 is once secured by this groove) (See FIG. 4), thereby the force is retained with the ball 16 being inserted in the groove 15 and without its getting over the ledge to the next groove 15. At the same time, this force will act upon the elastic member 12 to compress it. The plate member 11 and the support tube 13 will then abut the push-out plates 8 and 8', respectively. Furthermore, when the movable metal mold 4 is opened, the force (that is, the force acting on the knock-out pin 10→plate member 11→ball 16) will be transferred to the ball 16 which will be removed from the recessed groove 15 against the force of the spring 17 (See FIG. 5) and it will enter the next groove 15. At this moment (that is, when the ball passes over the ledge between one groove and the other 15) (See FIG. 6), the plates 8, 8' are pushed out forward by the dynamical stability or retroacting power of the elastic member 12 (simultaneously, push-out pins 6, 6' will also be pushed out). The repetition of this process (the resistance caused by the ball 16 when it passes over one groove 15 to the next one, that is, the repetition of compression and repulsion of the elastic member 12) will impart vibrations to the push-out pins 6, 6'.

In the drawings, reference numeral 21 is a cap screw for spring 17. 22 is a guide pin for the movable metal mold 4, and 23 denotes a guide pin hole for the stationary metal mold 5.

In the device of the present invention, it is designed that the vibrations will not be generated when the goods are in the metal mold and that after the goods has been pushed out from the metal mold the vibrations will be imparted by the vibration-generating pin continuously to the goods push-out pins so that the goods, runner and spool may be driven out in a moment. Thus, the removal procedure of the goods can be done rapidly with high safety and reliability. And the bigger the goods the bigger the dead load so that the effect of removing the goods by means of vibrations may be bigger and there is no need of using a robot unlike any conventional cases, thus making it possible to reduce the time intervals (shot times) of molding goods.

I claim:

1. An automatic mold goods dropping device characterized in that a vibration-generating pin is provided for imparting vibrations to goods push-out pins when the mold is opened, said vibrations being transferred to said mold goods so as to push out said goods instantaneously to thus automatically throw down said goods.

2. An automatic mold goods dropping device according to claim 1, characterized in that a vibration-generating pin is provided about its peripheral surface with a few recessed grooves that are arch form in vertical section, ball compressed by springs being inserted in said grooves, said balls imparting vibrations to said push-out pins by successively entering said grooves.

* * * * *